Figure 1:
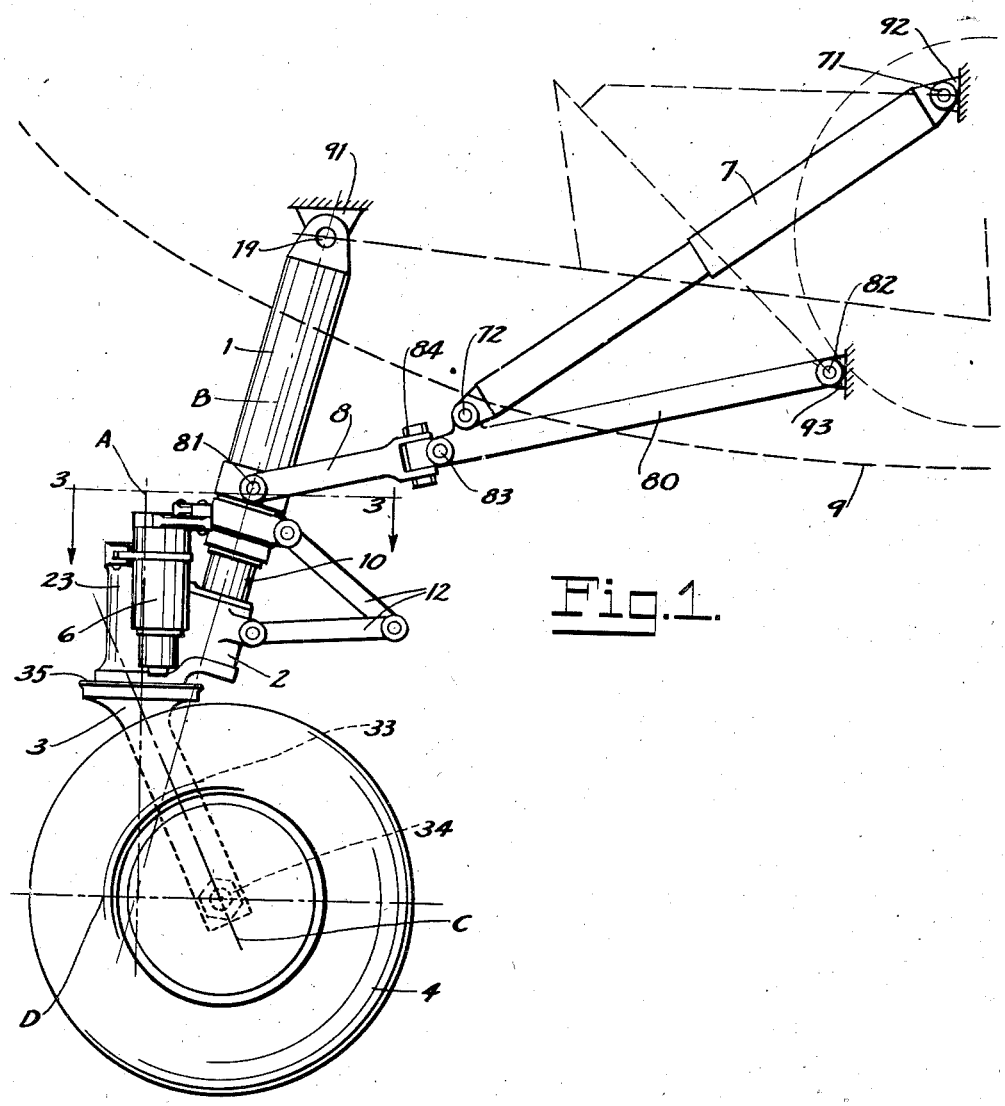

June 10, 1947.  C. H. STRANDBERG  2,421,914
NOSE WHEEL
Filed June 8, 1942   2 Sheets-Sheet 1

Inventor
Charles Henry Strandberg
By Reynolds H Beach
Attorneys

Inventor
Charles Henry Strandberg
By Reynolds & Beach
Attorneys

Patented June 10, 1947

2,421,914

UNITED STATES PATENT OFFICE 2,421,914

NOSE WHEEL

Charles H. Strandberg, Seattle, Wash., assignor to Boeing Aircraft Company, Seattle, Wash., a corporation of Washington Application June 8, 1942, Serial No. 446,293

3 Claims. (Cl. 244—102)

The nose wheel of an airplane is an integral part of the landing chassis, therefore must be so designed as to best absorb the heavy impacts of landing and as well, the lighter shocks due to taxying and take-off, and for proper controlled movement of the airplane while ground-borne, the nose wheel must swivel to some degree; preferably it should swivel through 360°. Since it must swivel it must also be arranged to trail. This freedom to swivel and the necessity for trailing, coupled with its disposition at the best angle for reciprocable shock absorber movement, which is upwardly and rearwardly at an angle in the vicinity of 15° from verticle, has created a tendency to shimmy, which may become very destructive.

Shimmy dampeners, generally in the nature of oscillatable hydraulic dampers, have been employed with such wheels, as also automatic centering means, but these cannot resist the violent shimmying action which may occur upon landing, particularly if there are lateral forces active upon the plane or upon the landing gear.

The problem of free swiveling with a trailing nose wheel such as this, and one which is subject to shimmying, has produced various attempted solutions, none of which has heretofore been found wholly satisfactory. The problem, moreover, is aggravated when, from the nature of the loads necessary to support, and the necessity of condensing the nose wheel upon retraction into a small space, the normally single nose wheel is divided, and dual wheels placed side by side have been substituted therefor. These dual wheels are equally spaced at opposite sides of a median plane through the swiveling axis, and usually through the shock absorber, which plane is usually also the vertical median longitudinal plane of the aircraft, in order to distribute the weight properly upon the two wheels. Such an arrangement is quite satisfactory so long as the wheels remain precisely in trail, parallel to the median longitudinal plane. When swiveling commences, however, it has been found that they tend to aggravate the shimmying tendency, and that the load will be alternately applied first to one wheel substantially alone, then to the other wheel. Even if there is no shimmying, with the arrangements heretofore available all the load has been placed on the inside wheel when making a turn, with the result that this wheel is overloaded just at the time when equal division of the load is most desirable.

I have discovered how the several parts of such a nose wheel may be formed and arranged relatively to one another to avoid these disadvantages, and to permit such a dual wheel nose mount, in particular, to swivel freely, to maintain the load distributed upon the two wheels with substantial equality in all their operative positions, to avoid to a large degree the tendency to shimmy, and yet to permit the shock absorber to be located at the optimum angle to produce the most desirable shock absorbing effects with the least stress on the shock absorber and wheel mounting mechanism.

I have also discovered how such a nose wheel may be arranged to permit an oscillation- or shimmy-damper being used in conjunction with it, while still permitting full swiveling through 360°.

I have also discovered how the parts of such a nose wheel may be relatively arranged to provide a yieldable self-centering or neutral return device to be used in conjunction with it without unduly restricting, and without at all limiting, the full swiveling of the wheel.

The problem here posed, and the solution of which will shortly be explained, is particularly applicable whenever the ground-engaging member has material breadth distributed substantially equally at opposite sides of the median plane referred to above. Such a ground-engaging member might be and normally would be a pair of wheels, and it is to this arrangement that the present invention is particularly directed. However, in its broader aspects the invention is also applicable to the case where the ground-engaging means is such as a broad ski mounted upon a transverse spindle trailing behind the swivel axis, or to the case where the ground-engaging member is such as an endless track or a float member, whenever any such ground-engaging member is also required to swivel, as it would be in most cases where it is the nose-supporting member of the aircraft.

The invention comprises the parts and the relative arrangement thereof, as described above, to the ends indicated.

In the accompanying drawings I have shown the principles of my invention embodied in a typical nose wheel for an aircraft, it being understood that various changes may be made in the form, nature, and arrangement of the parts of the device within the scope of the pinciples herein explained and claimed.

Figures 2, 3:
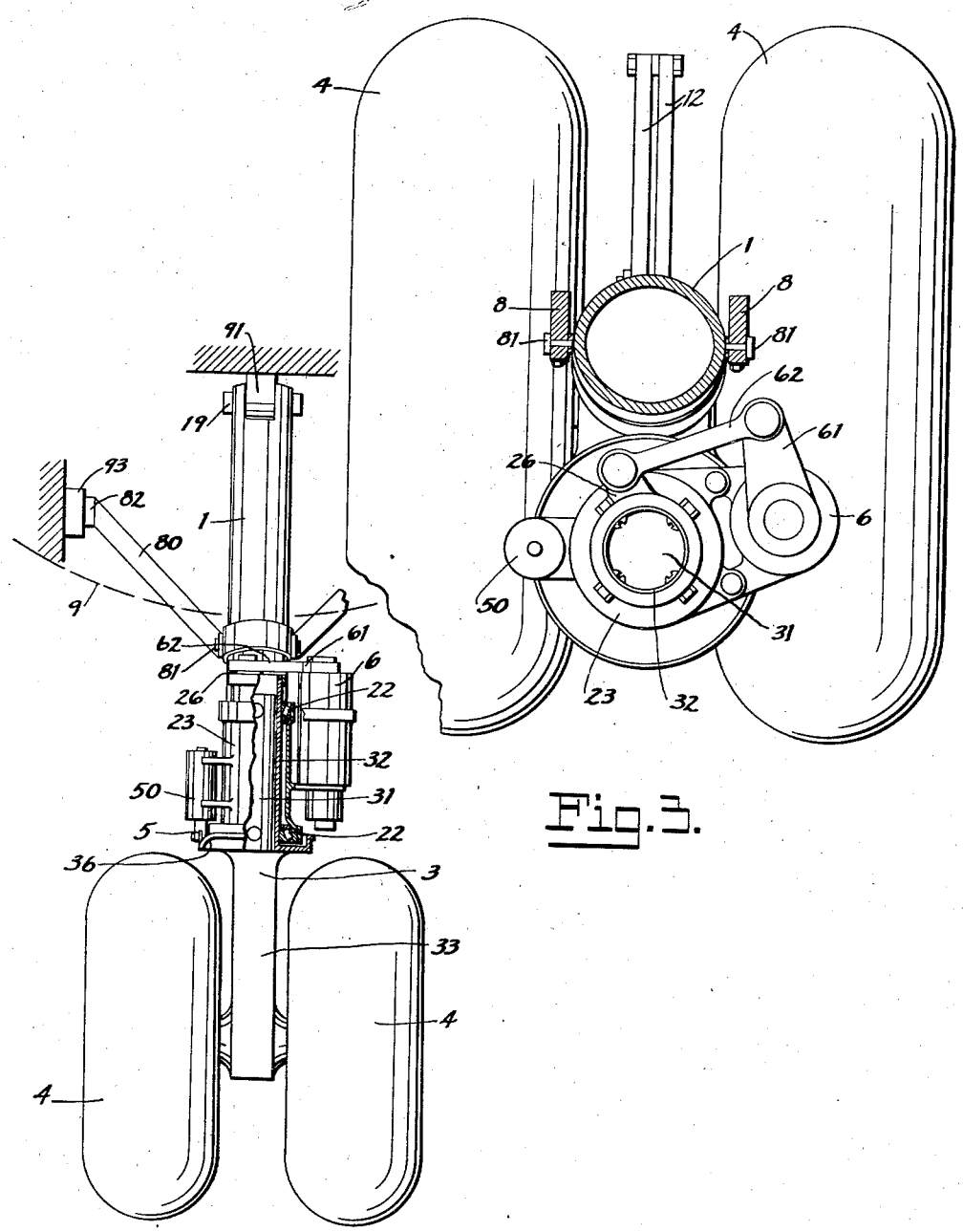

Figure 1 is a side elevation of such a nose wheel in operative position. Figure 2 is a front elevation of the same. Figure 3 is a section substantially on the line 3—3 of Figure 1.

Since the constructional details of the airplane are of no particular moment they have been omitted or shown merely conventionally. Thus 9 represents the nose portion of an airplane fuselage, from which the nose wheel depends, and into which, in the present arrangement, the nose wheel is retractable. Fixed supports within this aircraft structure are indicated at 91, 92, and 93, and to these fixed supports the several elements of the nose wheel and of its bracing and its retracting means are mounted by pivotal mountings. However, when in the projected position the nose wheel assembly, considered as a whole, is rigidly secured in its position relationship to the fuselage 9.

Pivoted at 19 to the pivot support 91 is the cylinder 1 of a shock absorber, the plunger 10 whereof reciprocates within the cylinder 1, being controlled in its longitudinal movement by any suitable mechanism, which, since it is conventional and known, is not here illustrated.

Mounted upon the lower end of the plunger 10 is a forging or the like, which for convenience may be termed a head, designated by the numeral 2. Preferably this is fixedly secured upon the plunger 10, and in order to prevent rotation of the head 2 relative to the cylinder 1 the two are connected by toggle links 12, or the plunger and cylinder of the shock absorber may be otherwise non-rotatively connected. These means hold the forwardly extending, vertically directed portion 23 of the head 2 rigidly in a fore and aft vertical median plane.

The portion 23 of the head 2 constitutes part of a swivel mounting, in this instance the surrounding sleeve, within which is journaled the hollow post 32 having fixed within it the solid post 31 of a wheel mounting 3. Suitable combined radial and thrust bearings 22 (see Figure 2) maintain the post 32 upright on the vertical axis A for swiveling movement through 360° with respect to the sleeve 23 and the head 2, of which the sleeve 23 is a part. The shock absorber, on the other hand, has its axis B inclined upwardly and rearwardly at such an angle, with respect to the axis A, that the shock absorber is best able to absorb the vertical components of the shock while still giving effect to the rearward components thereof, and without undue stress. The axes A and B lie in the vertical longitudinal median plane referred to above.

The axis B is held in this angular position relative to the fuselage 9 by brace means 8 and 80, the one pivoted to the cylinder 1 at 81, the other pivoted to the bracket 93 at 82. The brace is formed in two parts, articulated at 83 for retraction, and provided also with a transverse or nearly vertical pivot joint at 84 to accommodate slight oscillatory or sidewise movements of the nose wheel. The brace parts 8 and 80 are held in alignment to support the nose wheel rigidly in position, when projected, by the retracting jack consisting of the cylinder 7 pivoted at 71 to the bracket 92, and the jack plunger pivoted at 72 to the brace member 80.

The wheel mounting 3, in addition to the upright post 31, 32, includes a downwardly and rearwardly extending leg 33, which at its lower end carries a transverse spindle 34. This spindle preferably projects at each side of the leg 33, and upon these two halves of the spindle are mounted the ground-engaging members or wheels 4, one at each side of the leg 33. The downward and rearward inclination of the leg 33 locates the transverse axis of the spindle 34 and wheels 4 at a point rearwardly of the axis A, and preferably also rearwardly of the axis B. The inclination of the leg 33 is indicated by the line C. A horizontal line through the spindle 34, indicated at D, is perpendicular to the axis A, and while the ground contact area of the tire on the wheel is not quite parallel to the line D, it is substantially so.

It will now be apparent that if the wheels 4 may swivel around the axis A, in effect the plane indicated by the line D will remain always parallel to the ground since it is perpendicular to the axis A which is upright or perpendicular. It follows that neither of the wheels 4 can be raised above the ground to transfer the load to the other since they swivel always about the vertical axis A. It is also apparent that by reason of the downward and rearward inclination, indicated by the line C, the wheels always trail, and tend to follow the direction of the force acting on the nose of the fuselage. It is also clear that the axis B of the shock absorber is always inclined at that angle which has been found most suited to the proper absorption of shocks and to the relief of the mechanism from bending stresses.

Since it is not desirable to leave the wheels free to swivel except they are acted upon by some deflecting force, but rather it is preferred that they be retained always in fore and aft planes parallel to the vertical longitudinal median plane, I provide a centering means of suitable form. As shown herein a rim 35 is formed at the lower end of and outwardly from the sleeve 36 of the wheel mounting. This rim 35 rotates with the wheel mounting. It is provided with a low point 36, as best seen in Figure 2, and thus constitutes a self-centering cylindrical cam. With this cam cooperates a cam follower 5 pressed downwardly by a spring within the cartridge 50 mounted exteriorly and vertically upon the non-rotative sleeve 23.

In order to damp shimmying tendencies I provide the oscillation damper 6, supported from the non-rotative sleeve 3, and connected to the rotative sleeve 32. While similar connections are ordinarily made by means of lever arms and a connecting link, the arrangement as herein made is distinctive in that it is such as will permit full 360° swiveling of the rotative post 31, 32, and yet will provide shimmy damping whenever and to the extent necessary. The arrangement to this end is best shown in Figure 3.

Fast to the upper end of the sleeve 32 is a short arm 26. Fast upon the upper end of the oscillatory member of the shimmy damper 6 is a longer arm 61. Connecting these two arms is a link 62. The lengths of these arms and of the link 62 are so chosen that the arm 26 may rotate completely through 360°, and yet the arm 61 will only oscillate, and not rotate completely around the axis of the damper 6. The arm 61 may rotate over the top of the sleeve 32 in accomplishing this result. Thus it is possible for the wheel mounting to swivel through 360°, and the oscillation damper will not prevent such swiveling, resulting from the tendency of the wheel to trail. At the same time, if any violent or rapid oscillations should commence in the wheel, these will be damped by the damper 6, whatever the latter's position.

The retracted position of the nose wheel is shown diagrammatically by the dash lines in Figure 1. The retracting arrangements, however, have no particular connection with the present invention, which latter is concerned primarily with the wheel in its rigidly disposed operative or projected position, and with the arrangements permitting swiveling with a minimum tendency to shimmying, and yet permitting the location of the shock absorber at the best angle for absorption of shocks.

What I claim as my invention is:

1. A full-swiveling nose support for an aircraft comprising a shock absorber including two members relatively reciprocably but non-rotatively connected, its upper member being secured to the aircraft structure, and the shock absorber being forwardly and downwardly inclined, an upright swivel support fixed upon and disposed ahead of the lower shock absorber member, its swivel axis and the shock absorber's axis defining a fore-and-aft median plane, a ground-engaging member of material breadth, a mounting swiveled in said swivel support, and supporting said ground-engaging member normally in trail behind the swivel axis, with its breadth substantially equally distributed at opposite sides of such median plane, a short lever arm carried by said mounting, above the swivel support, an oscillable damper, including a long lever arm, carried by the swivel support, and a link interconnecting said lever arms, the lengths of the respective lever arms and the spacing of their axes being such that the mounting may swivel through 360° within the limits of the damper's oscillation.

2. A full-swiveling nose support for an aircraft comprising a shock absorber including two members relatively reciprocably but non-rotatively connected, its upper member being secured to the aircraft structure, and the shock absorber being forwardly and downwardly inclined, an upright swivel support fixed upon and disposed ahead of the lower shock absorber member, its swivel axis and the shock absorber's axis defining a fore-and-aft median plane, a ground-engaging member of material breadth, a mounting swiveled in said swivel support, and supporting said ground-engaging member normally in trail behind the swivel axis, with its breadth substantially equally distributed at opposite sides of such median plane, a short lever arm carried by said mounting, above the swivel support, an oscillable damper, including a long lever arm, carried by the swivel support, a link interconnecting said lever arms, the lengths of the respective lever arms and the spacing of their axes being such that the mounting may swivel through 360° within the limits of the damper's oscillation, and yieldable means normally restraining swiveling movement of the mounting from trailing position.

3. In a support for an aircraft, a shock strut carried by the aircraft and inclined upwardly and rearwardly, a swivel support element forward of the lower end of said shock strut and carried thereby, a ground-engaging member mounting element swiveled in said swivel support element, one of said elements carrying a cylindrical cam and the other of said elements carrying a spring-pressed rod movable in a direction generally parallel to the swivel axis and having on its end adjacent to said cam a cam follower engaging said cam, said cam being relieved to enable movement of said cam follower and said rod by its spring when said elements are disposed in a predetermined relationship, and said cam further being shaped to effect opposite movement of said cam follower and its rod in opposition to the pressure of its spring by relative rotation of said elements away from such predetermined relationship.

CHARLES H. STRANDBERG.

REFERENCES CITED

The following references are of record in the file of this patent:

UNITED STATES PATENTS

| Number | Name | Date |
|---|---|---|
| 2,291,518 | Wells | July 28, 1942 |
| 2,291,571 | Cleveland | July 28, 1942 |
| 2,336,567 | Potter et al. | Dec. 14, 1943 |

FOREIGN PATENTS

| Number | Country | Date |
|---|---|---|
| 821,573 | France | Aug. 30, 1937 |
| 454,198 | Great Britain | Sept. 25, 1936 |
| 308,244 | Italy | May 30, 1933 |
| 519,275 | Great Britain | Mar. 20, 1940 |
| 509,574 | Great Britain | July 18, 1939 |
| 799,002 | France | Mar. 14, 1936 |